United States Patent
Chen et al.

(10) Patent No.: US 6,168,861 B1
(45) Date of Patent: Jan. 2, 2001

(54) HIGH COERCIVITY, HIGH SIGNAL-TO-NOISE RATIO DUAL MAGNETIC LAYER MEDIA

(75) Inventors: Qixu Chen, Milpitas; Xing Song, Mountain View; Charles Leu, Fremont; Rajiv Yadau Ranjan, San Jose; Ga-Lane Chen, Fremont, all of CA (US)

(73) Assignee: Seagate Technology LLC, Scotts Valley, CA (US)

( * ) Notice: Under 35 U.S.C. 154(b), the term of this patent shall be extended for 0 days.

(21) Appl. No.: 09/188,677

(22) Filed: Nov. 10, 1998

Related U.S. Application Data

(60) Provisional application No. 60/069,536, filed on Dec. 12, 1997.

(51) Int. Cl.$^7$ ...................................................... G11B 5/66
(52) U.S. Cl. ................. 428/336; 478/332; 478/694 TM; 478/694 TS; 478/900
(58) Field of Search .................. 428/694 TM, 694 TS, 428/900, 336, 332

(56) References Cited

U.S. PATENT DOCUMENTS

| | | | |
|---|---|---|---|
| 5,432,012 | 7/1995 | Lal et al. | 428/610 |
| 5,432,017 * | 7/1995 | Lal | 428/610 |
| 5,558,945 * | 9/1996 | Miyazaki et al. | 428/611 |
| 5,674,637 * | 10/1997 | Miyazaki | 428/694 T |
| 5,763,071 | 6/1998 | Chen et al. | 428/332 |
| 5,840,394 * | 11/1998 | Renjei | 428/653 |
| 5,952,097 * | 9/1999 | Zhang | 428/332 |
| 6,007,924 * | 12/1999 | Lal | 428/611 |

FOREIGN PATENT DOCUMENTS 5-114128   5/1993   (JP) .

* cited by examiner

*Primary Examiner*—Leszek Kiliman
(74) *Attorney, Agent, or Firm*—McDermott, Will & Emery

(57) ABSTRACT

A high areal density magnetic recording medium with high remanent coercivity and high signal-to-noise ratio is formed with dual magnetic layers, the first or lower magnetic layer having a higher saturation magnetization than the second or upper magnetic layer. Embodiments include first and second magnetic layers containing Co and Pt, wherein the first magnetic layer comprises less platinum than the second, e.g., a first magnetic layer of Co15%Cr8%Pt4%Ta and a second magnetic layer of Co15%Cr11%Pt4%Ta.

19 Claims, 7 Drawing Sheets

HIGH COERCIVITY, HIGH SIGNAL-TO-NOISE RATIO DUAL MAGNETIC LAYER MEDIA

RELATED APPLICATIONS

This application claims priority from Provisional Patent Application Ser. No. 60/069,536 filed Dec. 12, 1997, entitled "DUAL LAYER MEDIUM FOR HIGHER COERCIVITY AND HIGHER SIGNAL-TO-NOISE RATIO", the entire disclosure of which is hereby incorporated herein by reference.

TECHNICAL FIELD

The present invention relates to a magnetic recording medium, such as a thin film magnetic recording disk. The present invention is particularly applicable to high areal density magnetic recording media exhibiting high remanent coercivity and low medium noise.

BACKGROUND ART

The increasing requirements for high areal recording density impose increasingly greater demands on thin film magnetic recording media in terms of remanent coercivity (Hr), magnetic remanence (Mr), coercivity squareness (S*), medium noise or signal-to-noise ratio (SNR) and narrow track recording performance. It is extremely difficult to produce a magnetic recording medium satisfying such demanding requirements, particular a high areal density magnetic recording disk medium.

The linear recording density can be increased by increasing the coercivity of the magnetic recording medium. However, this objective can only be accomplished by decreasing the medium noise, as by maintaining very fine magnetically non-coupled grains. Medium noise is a dominant factor restricting increased recording density of magnetic hard disk drives and, hence, has become a barrier to ultra-high areal density recording. Medium noise in thin films is generally attributed primarily to inhomogeneous grain size and intergranular exchange coupling among magnetic grains. Accordingly, considerable effort has been devoted to minimizing medium noise by suitable microstructure control.

A typical longitudinal magnetic recording medium is depicted in FIG. 1 and comprises a substrate 10, typically an aluminum (Al) -alloy, such as an aluminum-magnesium (Al—Mg) -alloy, plated with a layer of amorphous nickel-phosphorous (NiP). Alternative substrates include glass, ceramic and glass-ceramic materials, and graphite. Substrate 10 typically contains sequentially deposited on each side thereof a chromium (Cr) or Cr-alloy underlayer 11, 11', a cobalt (Co)-based alloy magnetic layer 12, 12', a protective overcoat 13, 13', typically containing carbon, and a lubricant topcoat 14, 14'. Cr underlayer 11, 11' can be applied as a composite comprising a plurality of sub-underlayers 11A, 11A'. Cr underlayer 11, 11', Co-base alloy magnetic layer 12, 12' and protective carbon overcoat 13, 13' are usually deposited by sputtering techniques performed in an apparatus containing sequential deposition chambers or stations. A conventional Al-alloy substrate is provided with a NiP plating, primarily to increase the hardness of the Al substrate, serving as a suitable surface for polishing to provide a texture, which is substantially reproduced on the disk surface.

Conventional non-magnetic alternative substrate materials include glass, ceramic and glass-ceramic materials, on which seedlayers, such as NiP, have been deposited under the underlayers. In addition, adhesion enhancement layers, such as Cr or Cr alloys, have been deposited between the seedlayers and the substrates.

Kodama et al., Japanese Patent 5-114128, disclose a film structure comprising a substrate, Cr underlayer, and dual magnetic layers, one comprising Co, Cr, tantalum (Ta) and the other comprising Co, Cr and platinum (Pt). However, the coercivity of the medium disclosed by Kodama et al. with such a dual magnetic layer structure is less than that of a medium with a single magnetic layer of Co, Cr and Pt. Thus, the dual magnetic layer structure of Kodama et al. does not satisfy the current demand for higher recording density with higher coercivity and higher SNR.

Lal et al., U.S. Pat. No. 5,432,012, disclose a magnetic thin-film medium comprising a magnetic layer with a compositional gradient, wherein the lowermost stratum is composed of a first alloy having a relatively low noise and low Mr and an uppermost stratum composed of a second alloy having a relatively high noise and high Mr. The disclosed medium is said to exhibit a higher coercivity and less noise than a similar medium composed of either the first or second magnetic alloy layer. The typical values of $4\pi$ Mr of the first stratum of Lal et al., Co, Cr, Ta, and second stratum Co, Ni, Cr, are 6,493 and 11,435 Gauss, respectively, as reported in Table II of Lal et al.

In U.S. Pat. No. 5,763,071, a high areal density magnetic recording medium is disclosed with dual magnetic layers, wherein the first magnetic layer is magnetically anisotropic in the second magnetic layer is magnetical isotropic.

There exist a need for a thin film magnetic recording medium for high areal recording density exhibiting high Hr and high SNR.

DISCLOSURE OF THE INVENTION

An advantage of the present invention is a magnetic recording medium for high areal recording density exhibiting low noise and high remanent coercivity.

Additional advantages and other features of the invention will be set forth in part in the description which follows and in part will become apparent to those having ordinary skill in the art upon examination of the following only to be learned from the practice of the invention. The advantages of the invention may be realized and obtained as particularly pointed out in the appended claims.

According to the present invention, the foregoing and other advantages are achieved, in part or in part by a magnetic recording medium comprising: a non-magnetic substrate; a first magnetic layer; and a second magnetic layer on the first magnetic layer, wherein the first magnetic layer has a higher saturation magnetization (Ms) than that of the second magnetic layer.

Another aspect of the present invention is a magnetic recording medium comprising: a non-magnetic substrate; a first magnetic layer; and a second magnetic layer on the first magnetic layer, wherein the first magnetic layer has a higher Ms than that of the second magnetic layer and each magnetic layer comprises an alloy of cobalt containing platinum, wherein the content, in atomic percentage, of platinum in the second magnetic layer is greater than the content of platinum in the first magnetic layer.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its details are capable of modifications in various obvious respects, all without departing from the present invention. Accordingly, the drawings and description are to be regarded as illustrative in nature, and not as restrictive.

DESCRIPTION OF THE INVENTION

The present invention enables the manufacture of magnetic recording media having a high areal recording density and a high Hr without sacrificing SNR. In fact, magnetic recording media of the present invention not only exhibit a high Hr but also a high SNR. High areal recording density in combination with desirable magnetic properties is achieved in accordance with the present invention by the strategic use of dual magnetic layers.

Figure 4A:
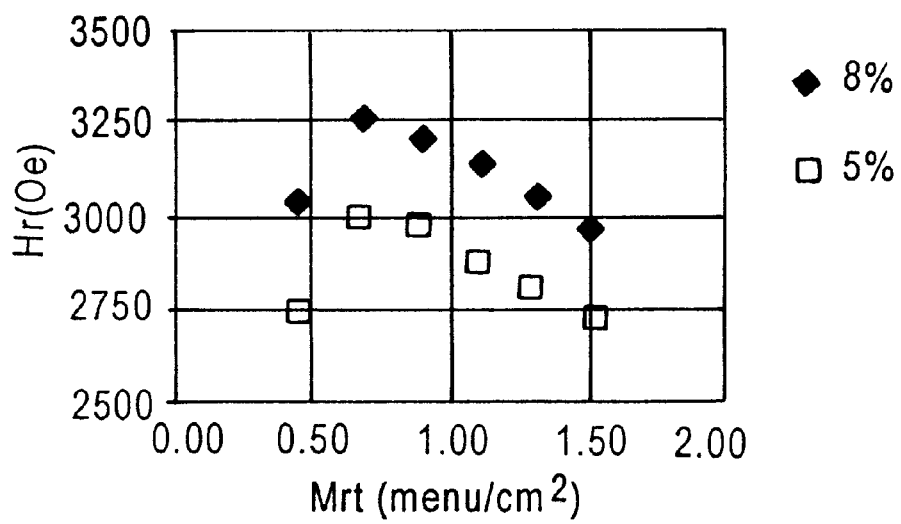
FIGS. 4A and 4B are graphs comparing Hr and SNR, respectively, of media comprising magnetic layers with different platinum contents.
Figure 4B:
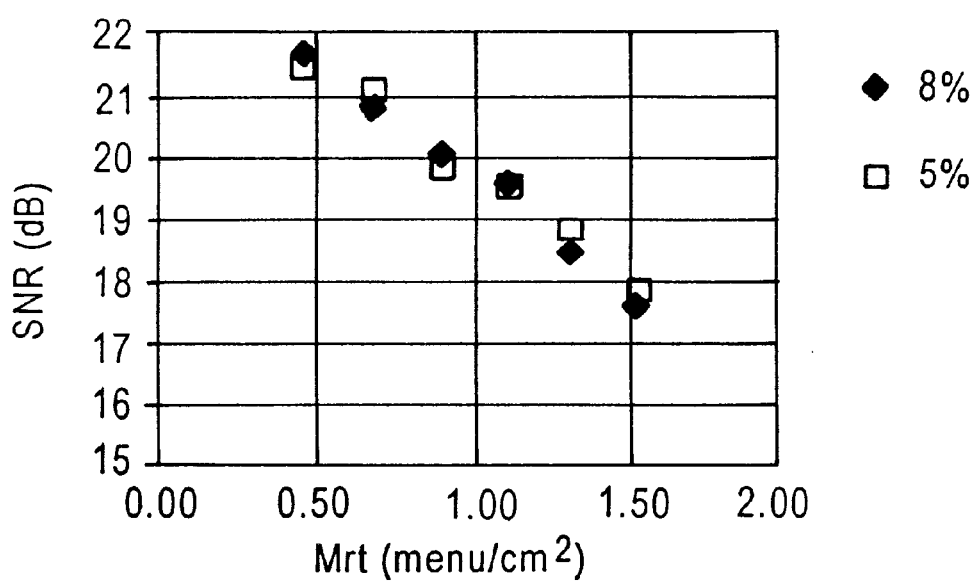
Figure 5A:
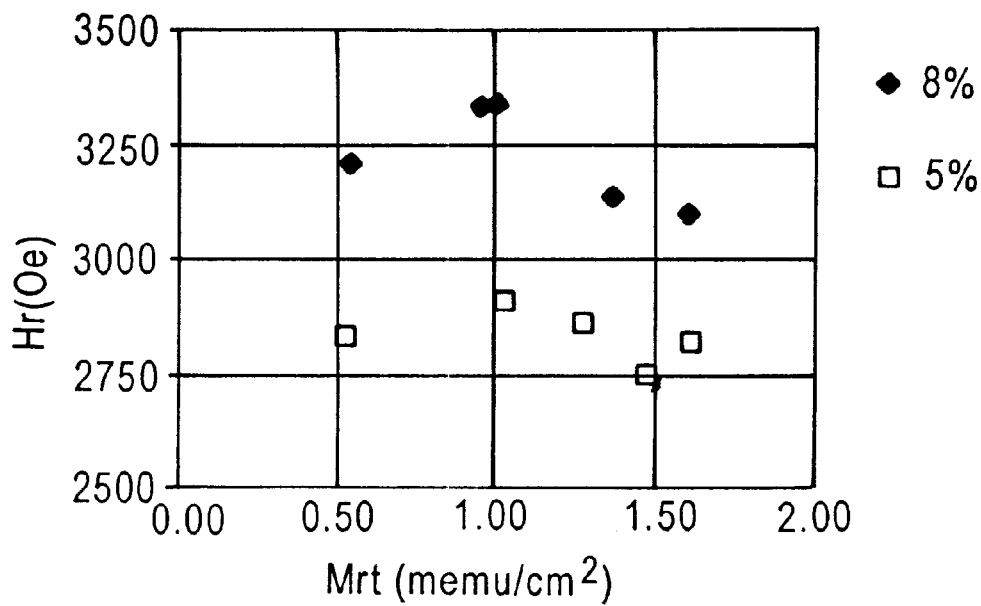
FIGS. 5A and 5B are graphs comparing Hr and SNR, respectively, of two media comprising CrV underlayers and magnetic layers with different platinum contents.
Figure 5B:
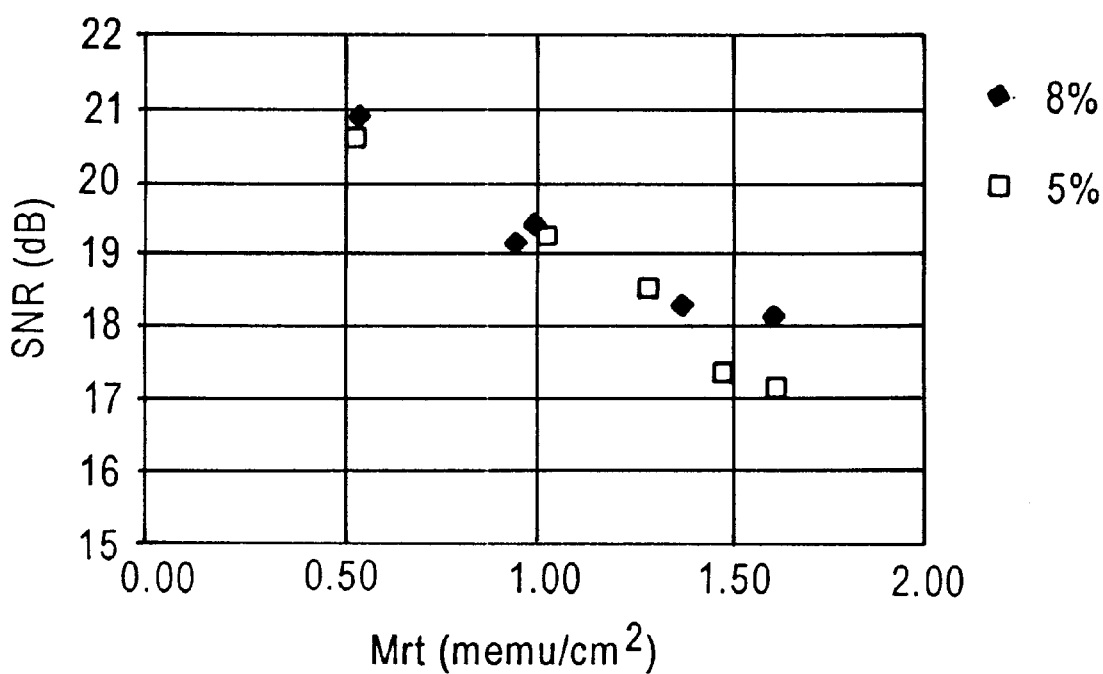

Conventional magnetic recording media typically comprise a single magnetic layer of a Co-based alloy, such as CoCrPtTa. After extensive experimentation and investigation, it was found that as the Pt concentration of a CoCrPtTa single magnetic layer increases, Hr typically increases if the Pt concentration is not too high. For example, adverting to FIG. 4A, it was found that the Hr of a medium comprising a Cr underlayer and a Co15%Cr8%Pt4%Ta magnetic layer deposited on a NiP-plated Al-alloy substrate is greater than that of a substantially similar medium containing a Co15%Cr5%Pt4%Ta magnetic layer; while the SNR was essentially the same as shown in FIG. 4B, measured at 240 kiloflux change per inch (KFCI) using a magnetoresistive (MR) head. Similar results were achieved employing a chromium-vanadium (CrV) underlayer, as shown in FIG. 5. All percentages expressed herein are atomic percentages.

Figure 6:
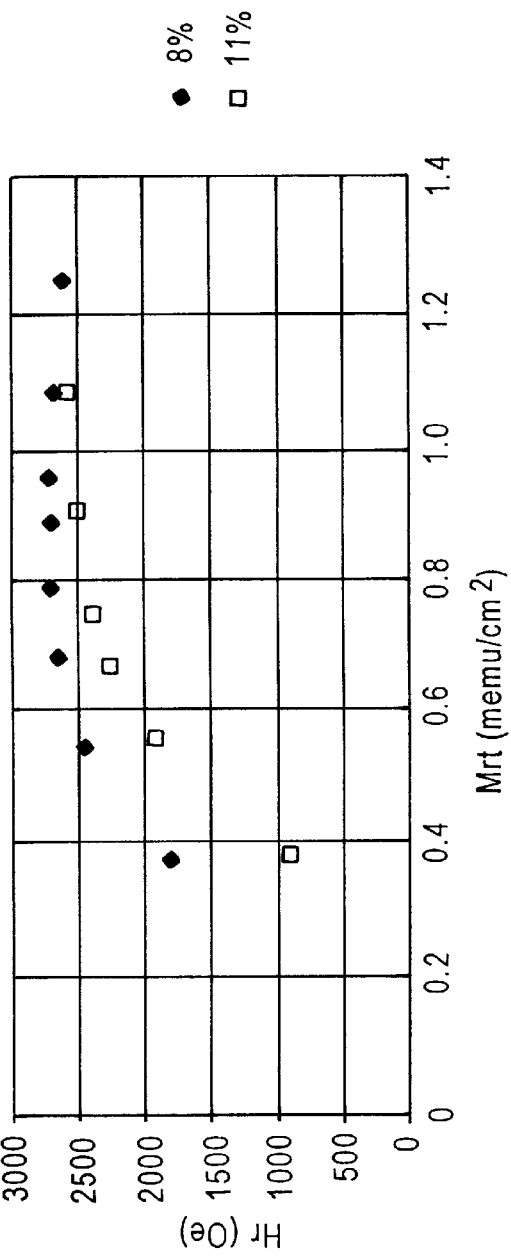
FIG. 6 is a graph showing Hr and the product of magnetic remanence and film thickness (Mrt) for media comprising a magnetic layer with different platinum contents.

It was also found that a medium comprising a glass-ceramic substrate, NiP seedlayer, CrV underlayer, and Co 15%Cr11%Pt4%Ta magnetic layer has a significant lower Hr than that of a medium having a single magnetic layer of Co15%Cr8%Pt4%Ta, particularly when the magnetic layer Mrt is less than 1.0 menu/cm$^2$, as shown in FIG. 6.

Figure 7:
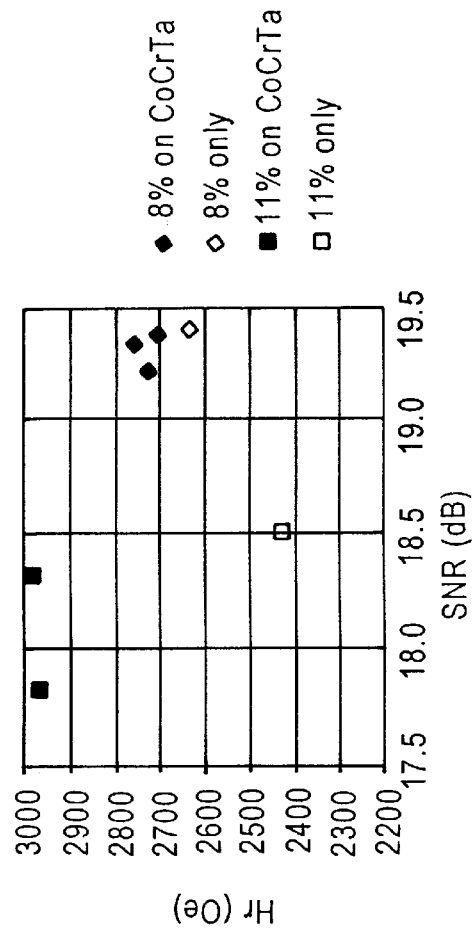
FIG. 7 compares the Hr and SNR of media having magnetic layers with different platinum contents, with and without a CoCrTa intermediate layer.

Upon further experimentation and investigation, it was found that the SNR of a medium comprising a Co15%Cr11%Pt4%Ta magnetic layer, with and without a Co14%Cr4%Ta intermediate layer, was significantly lower than that of a medium comprising a Co15%Cr8%Pt4%Ta magnetic layer, with and without a CoCrTa magnetic layer, as shown in FIG. 7.

Magnetic recording media comprising CoCrTa intermediate layers are disclosed in copending application Ser. No. 09/188,682, filed on Nov. 10, 1998, now pending, copending application Ser. No. 09/188,681, filed on Nov. 10, 1998, now pending, and copending application Ser. No. 09/188,715, filed on Nov. 10, 1998, now pending the entire disclosures of which are incorporated herein by reference.

The present invention achieves both high Hr and high SNR by the strategic use of dual magnetic layers. Embodiments of the present invention include forming a first or lower magnetic layer having a higher Ms than that of the second or upper magnetic layer. Embodiments of the present invention include the use of dual CoCrPtTa magnetic layers having differential Pt contents, e.g., the first or lower magnetic layer has a Pt concentration lower than that of the second or upper magnetic layer.

The various embodiments of the present invention can comprise an underlayer or composite underlayers, typically Cr-containing underlayers, such as CrV, as well as a seedlayer and an adhesion enhancement layer between the underlayer and substrate. In the various embodiment of the present invention, the substrate can comprise any substrate conventionally employed in the manufacture of magnetic recording media, such as an NiP-plated Al alloy, e.g. an AlMg alloy, as well as glass, ceramic or glass-ceramic substrates. The present invention also encompasses a thin magnetic intermediate layer under the first magnetic layer, such as a thin magnetic layer of CoCrTa having a thickness of about 1.5 Å to about 150 Å and containing about 10 to about 20 atomic percent Cr and about 1 to about 6 atomic percent Ta.

Multi-magnetic layer magnetic recording media in accordance with the present invention, without an intermediate CoCrTa layer, have a significantly higher Hr than similar media comprising only a single CoCrPtTa layer. Multi-magnetic layer media in accordance with the present invention containing an intermediate CoCrTa layer exhibit a significantly higher Hr than that of similar media containing only a single magnetic layer, such as a single Co15%Cr8%Pt4%Ta magnetic layer. Dual magnetic layer media in accordance with the present invention containing a first lower magnetic layer with a Pt content less than that of the second upper magnetic layer exhibit significantly reduced noise, with or without a CoCrTa intermediate layer, than a magnetic recording medium containing a single Co15%Cr11%Pt4%Ta magnetic layer and similar to that containing a single Co15%Cr8%Pt4%Ta magnetic layer.

Suitable compositions for the first and second magnetic layers in embodiments of the present invention are set forth in Table I below, with the amounts representing atomic percentages.

TABLE I

| Composition | Co | Cr | Pt | Ta |
|---|---|---|---|---|
| First Magnetic layer | balance | 14–16 | 7.5–8.5 | 3.5–4.5 |
| Second Magnetic Layer | balance | 14–16 | 10.5–11.5 | 3.5–4.5 |

The thickness and thickness ratio of the first and second magnetic layers can easily be optimized in a particular situation, given the disclosed objectives. For example, the objectives of the present invention can be achieved by employing a thickness ratio of the first magnetic layer to the second magnetic layer of about 0.9 to about 1.1. The first and second magnetic layers can have a thickness of about 50 Å to about 370 Å, e.g. about 70 Å to about 240 Å, respectively. The first magnetic layer can exhibit an Mrt of about 0.18 to about 1.3 memu/cm$^2$, e.g. about 0.25 to about 0.84 memu/cm$^2$; while the second magnetic layer can exhibit an Mrt of about 0.16 to about 1.17 memu/cm$^2$, e.g. about 0.22 to about 0.76 memu/cm$^2$.

Figure 1:
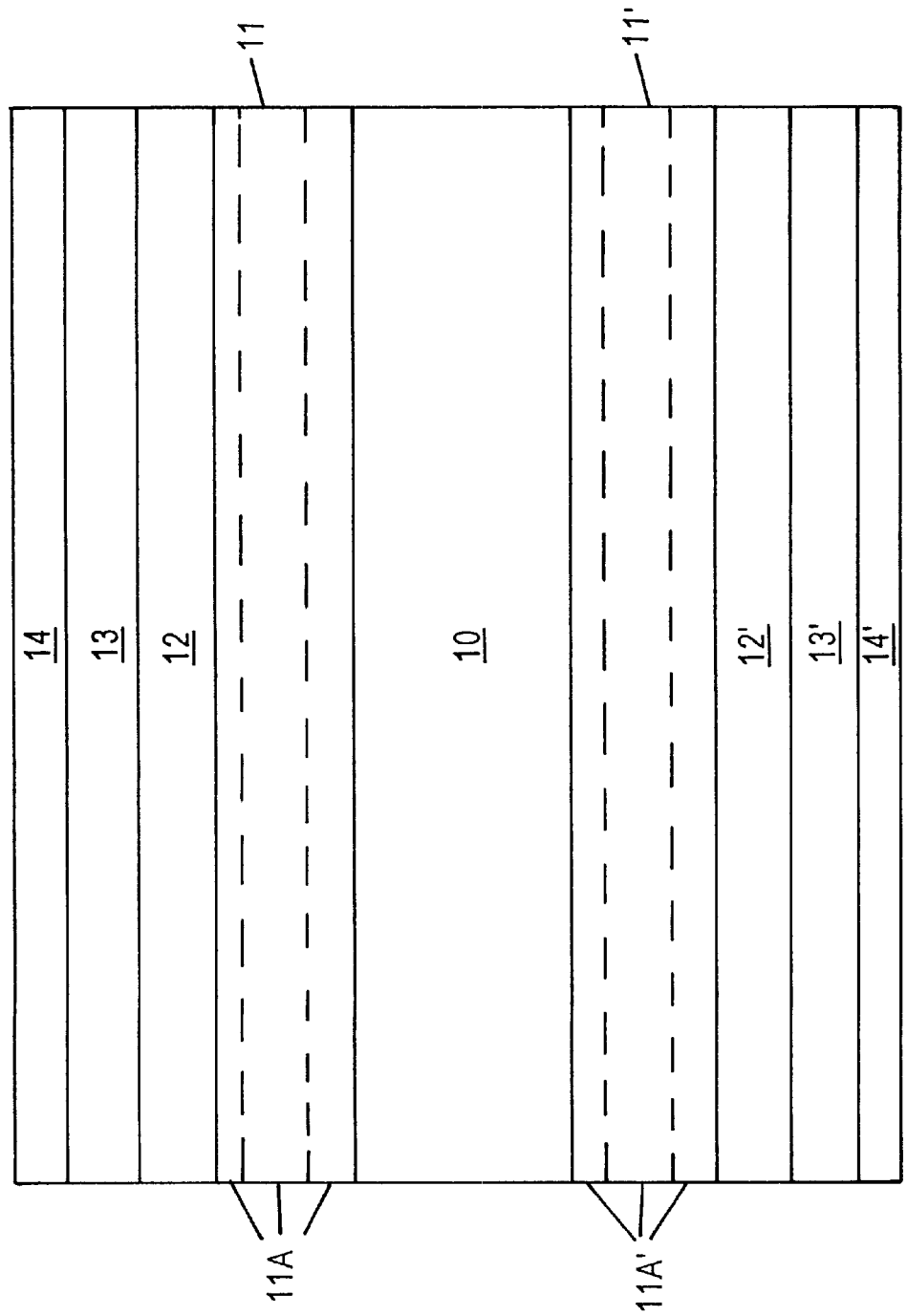
FIG. 1 schematically illustrates a conventional magnetic recording medium structure.
Figure 2:
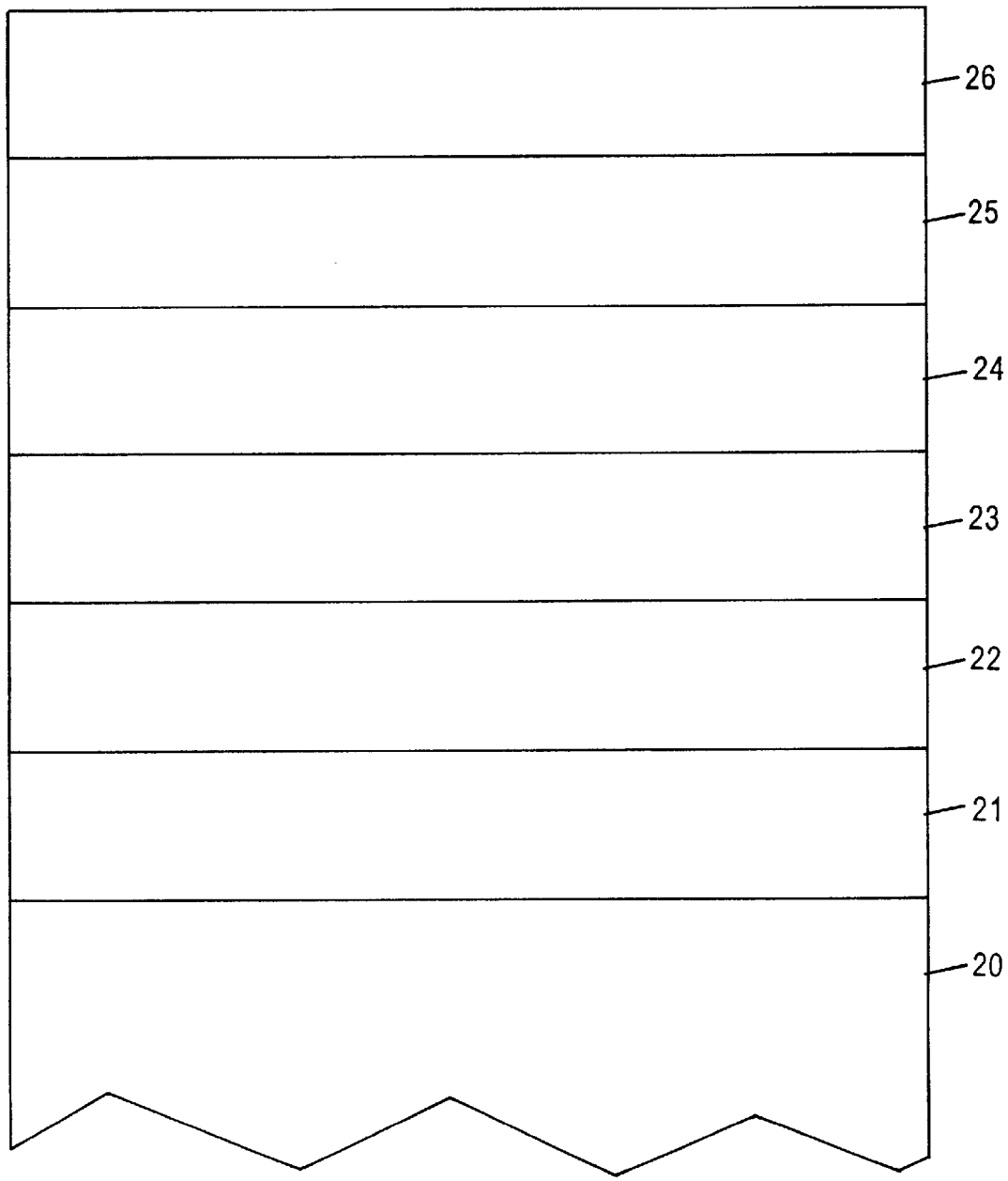
FIG. 2 schematically illustrates a magnetic recording medium in accordance with an embodiment of the present invention.

A magnetic recording medium in accordance with the present invention is illustrated in FIG. 2 and comprises substrate 20. It is understood that the various layers sequentially deposited on the surface of the substrate are typically deposited on both sides of the substrate as shown in FIG. 1. However for illustrative convenience, the embodiment depicted in FIG. 2 illustrates the various layers deposited on one side of the non-magnetic substrate 20. Non-magnetic substrate 20 can comprise any substrate conventionally employed in the manufacture of magnetic recording media, such as NiP-plated AlMg, or a glass, ceramic or glass-ceramic substrate. Although, not shown in FIG. 2, for illustrative convenience, embodiments of the present invention include magnetic recording media comprising a conventional adhesion enhancement layer and/or seedlayer.

Adverting to FIG. 2, layer 21 denotes an underlayer, such as a Cr-containing underlayer, e.g. CrV, which is optional. Layer 22 denotes an optional intermediate CoCrTa layer, which provides enhanced Hr. The embodiment of the present invention depicted in FIG. 2 is characterized by the presence of first lower magnetic layer 23 and second upper magnetic layer 24. First magnetic layer 23 has a higher Ms than that of second magnetic layer 24. Magnetic layers 23 and 24 can comprise the compositions set forth in Table I above.

With continued reference to FIG. 2, layer 25 represents a conventional protective overcoat, such as a carbon-containing protective overcoat, while layer 26 represents a conventional lubricant topcoat. Layers 21, 22, 23, 24 and 25 are typically deposited by sputter deposition.

Figure 3:
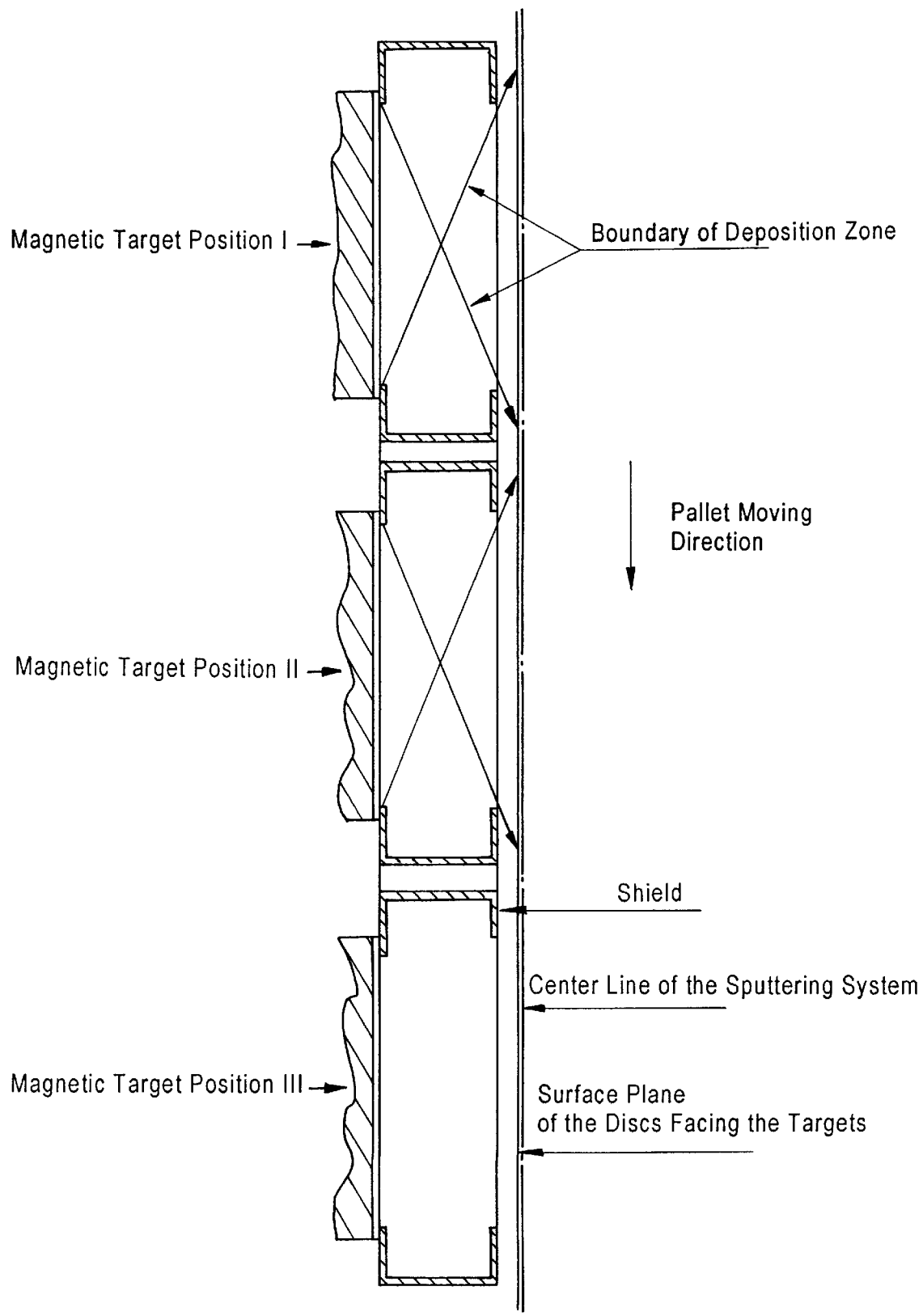
FIG. 3 is a cross-sectional view of a deposition chamber of a sputtering system for producing a magnetic recording medium of the present invention.

A cross-sectional view of a deposition chamber of a sputtering system which can be employed to produce magnetic recording media of the present invention, such as depicted at FIG. 2, is shown in FIG. 3. The magnetic target for the first magnetic layer can be installed at position I. The magnetic target for the second magnetic layer can be installed at position II or position III. The shields and the distances between the targets are arranged such that there is substantially no overlap of the deposition zones of target I and target II at the surface point of the disk. There is no compositional gradient in the magnetic layers. In order to ensure superior epitaxial growth of the second magnetic layer on the first magnetic layer, the distance between the two targets and the speed of the pallet holding the substrates are selected such that the travel of time of the disk from the trailing edge of the first deposition zone to the leading edge of the second deposition zone is very short, e.g. less than about 6 seconds.

EXAMPLE

Magnetic recording media containing single magnetic layers and magnetic recording media in accordance with embodiments of the present invention containing dual magnetic layers of CoCrPtTa films, with and without CoCrTa intermediate layers, were deposited on NiP seedlayers which, in turn, were deposited on Cr adhesion enhancement layers on underlying glass-ceramic substrates. All CoCrTa and CoCrPtTa films of the samples representative of the present invention have a composition of Co14%Cr4%Ta and Co15%CrPt4%Ta, respectively. The single CoCrPtTa layers were CoCr8%PtTa and CoCr11%PtTa respectively. The dual magnetic layers in accordance with the present invention were CoCr8%PtTa/CoCr11%PtTa having a thickness ratio of 1.0. DC magnetron sputtering was employed at an argon pressure of about 7.5 mTorr and a substrate temperature of about 250° C., using an in-line, pass-by sputtering system and deposition chamber, such as that depicted in FIG. 3.

Figure 8:
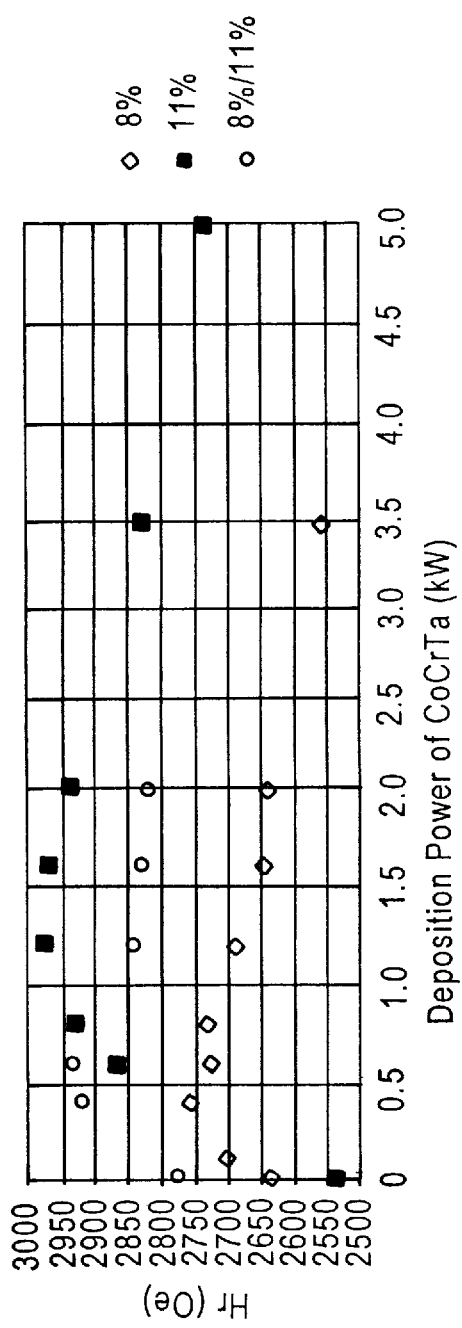
FIG. 8 illustrates higher Hr achieved using a dual magnetic layer of the present invention vis-á-vis a single magnetic layer medium, with and without a CoCrTa intermediate layer.
Figure 9:
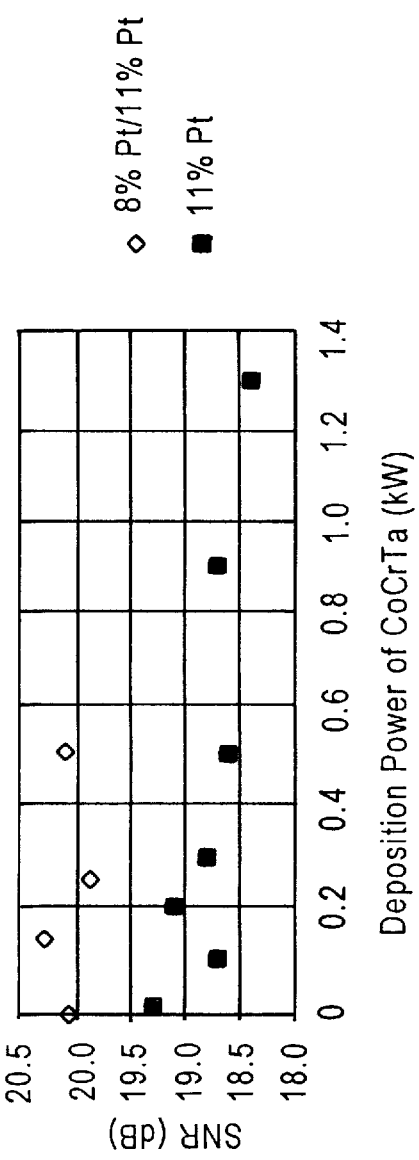
FIG. 9 illustrates that a higher SNR is achieved with a dual magnetic layer medium of the present invention vis-á-vis a single magnetic layer medium, with and without a CoCrTa intermediate layer.

The samples were subjected to Hr and SNR testing and the results are shown in FIGS. 8 and 9. The Mrt of the tested media are about 0.8 and 0.7 memu/cm$^2$, respectively, for the media reported in FIGS. 8 and 9, and the SNR was measured with an MR head at 235 KFCI (kiloflux changes per inch).

Adverting to FIG. 8, it is apparent that the Hr of the magnetic recording medium in accordance with the present invention containing dual layers without an CoCrTa intermediate layer is significantly higher than that of media containing single magnetic layers of CoCrPtTa with 8%Pt and 11%pt. When employing an intermediate CoCrTa layer, the coercivity of the medium in accordance with the present invention containing dual magnetic layers is significantly higher than the medium containing a single magnetic layer of CoCr8%PtTa and approximately that of the medium containing a single magnetic layer of CoCr11%PtTa. Adverting to FIG. 9, it is apparent that the SNR of the dual magnetic layer recording medium in accordance with the present invention is significantly higher than the medium containing a single magnetic layer of CoCr11%PtTa.

In Table II below are set forth comparison data of media fabricated under identical deposition conditions except for the CoCrPtTa magnetic alloy. Both media were deposited under identical conditions as those employed for the media tested and reported in FIG. 8. The intermediate layers were Co14%Cr4%Ta and deposited on CrV underlayers which were deposited on glass-ceramic substrates. The Mrt of the media is about 0.8 memu/cm$^2$. The SNR was measured at 235 KFCI with an MR head.

TABLE II

| Films | Hr (Oe) | SNR (dB) |
|---|---|---|
| CoCrTa/CoCr 8% Pt Ta | 2757 | 19.3 |
| CoCrTa/CoCr 8% Pt Ta/CoCr 11% PtTa | 2922 | 19.0 |

The medium containing a dual magnetic layer structure in accordance with the present invention exhibited a significantly higher Hr than that of the medium comprising a CoCr8%PtTa magnetic layer, and the SNR of the two media were similar. The saturation magnetization of media containing single magnetic layers of Co15%Cr8%Pt4%Ta and Co15%Cr11%Pt4%Ta is, respectively, 390 and 350 emu/cm³, measured with a vibrating sample magnetometer and a Tencor surface profiler. The squareness of the media is about 0.8 to about 0.9. The 4πMr values of the Co15%Cr8%Pt4%Ta and Co15%Cr11%Pt4%Ta films are about 3900 and 3500 emu/cm³, respectively, if the squareness is taken as 0.8.

The present invention, therefore, provides magnetic recording media having high areal recording density, a high Hr and a high SNR. The present invention enjoys utility in fabricating a wide variety of magnetic recording media, including magnetic recording media for hard disk drives using GMR (giant magnetoresistive) heads. The magnetic recording media of the present invention are not limited to any particular substrate material, adhesion promoting layer, seed layer, underlayer, interlayer, protective overcoat or lubricant topcoat, or to any particular magnetic alloys, given the objectives of the present invention.

Only certain embodiments of the present invention and but a few examples of its versatility as shown and described in the present disclosure. It is to be understood that the present invention is capable of use in various other combinations and environments and is capable of changes or modifications within the scope of the inventive concept as expressed herein.

What is claimed is:

1. A thin film magnetic recording medium comprising:
    a non-magnetic substrate;
    a first magnetic layer; and
    a second magnetic layer directly on the first magnetic layer, wherein the first magnetic layer has a higher saturation magnetization than that of the second magnetic layer, wherein there is no compositional gradient in the first and second magnetic layers.

2. The magnetic recording medium according to claim 1, wherein;
    the first and second magnetic layers each comprises a cobalt alloy containing platinum; and
    the platinum content of the second magnetic layer is greater than the platinum content of the first magnetic layer.

3. The magnetic recording medium according to claim 2, wherein:
    the first and second magnetic layers each comprises an alloy of cobalt, chromium, platinum and tantalum.

4. The magnetic recording medium according to claim 3, wherein;
    the first magnetic layer comprises about 7.5 to about 8.5 atomic percent platinum; and
    the second magnetic layer comprises about 10.5 to about 11.5 atomic percent platinum.

5. The magnetic recording medium according to claim 3, wherein;
    the first magnetic layer comprises alloy of cobalt with about 14 to about 16 atomic percent chromium, about 7.5 to about 8.5 atomic percent platinum and about 3.5 to about 4.5 atomic percent tantalum; and
    the second magnetic layer comprises an alloy of cobalt with about 14 to about 16 atomic percent chromium, about 10.5 to about 11.5 percent platinum and abut 3.5 to about 4.5 atomic percent tantalum.

6. The magnetic recording medium according to claim 5, wherein;
    the ratio of the thickness of the first magnetic layer to the thickness of the second magnetic layer is about 0.9 to about 1.1.

7. The magnetic recording medium according to claim 6, wherein:
    the first magnetic layer has a thickness of about 40 Å to about 370 Å; and
    the second magnetic layer has a thickness of about 40 Å to about 370 Å.

8. The magnetic recording medium according to claim 7, wherein;
    the first magnetic layer has a thickness of about 43 Å to about 240 Å; and
    the second magnetic layer has a thickness of about 43 Å to about 240 Å.

9. The magnetic recording medium according to claim 5, further comprising an intermediate layer containing cobalt, chromium and tantalum under the first magnetic layer.

10. The magnetic recording medium according to claim 9, wherein the intermediate layer has a thickness of about 1.5 Å to about 150 Å.

11. The magnetic recording medium according to claim 10, wherein the intermediate layer contains cobalt, about 10 to about 20 atomic percent chromium and about 1 to about 6 atomic percent tantalum.

12. The magnetic recording medium according to claim 5, further comprising an underlayer under the first magnetic layer.

13. The magnetic recording medium according to claim 9, further comprising an underlayer under the intermediate layer.

14. The magnetic recording medium according to claim 12, further comprises a seed layer under the underlayer.

15. The magnetic recording medium according to claim 14, further comprising an adhesion enhancement layer under the seed layer.

16. The magnetic recording medium according to claim 12, wherein the non-magnetic substrate comprises a nickel-phosphorous-plated aluminum magnesium alloy, or a glass, ceramic or glass-ceramic material.

17. The magnetic recording medium according to claim 12, further comprising:
    a protective overcoat on the magnetic layer; and
    a lubricant topcoat on the protective overcoat.

18. The magnetic recording medium according to claim 1, wherein:
    the first magnetic layer has an Mrt (magnetic remanence×thickness) of about 0.14 to about 1.3 memu/cm²; and
    the second magnetic layer has an Mrt of about 0.13 to about 1.17 memu/cm².

19. The magnetic recording medium according to claim 18, wherein;
    the first magnetic layer has an Mrt of about 0.15 to about 0.84 memu/cm²; and
    the second magnetic layer has an Mrt of about 0.14 to about 0.76 memu/cm².

* * * * *